United States Patent [19]

Smith

[11] Patent Number: 4,830,049

[45] Date of Patent: May 16, 1989

[54] PNEUMATIC PENDANT

[75] Inventor: Glenn S. Smith, Issaquah, Wash.

[73] Assignee: Beebe International Inc., Seattle, Wash.

[21] Appl. No.: 112,712

[22] Filed: Oct. 26, 1987

[51] Int. Cl.⁴ ............................................. F15B 13/08
[52] U.S. Cl. .................................... 137/596; 212/160; 251/231; 251/297
[58] Field of Search ....................... 137/596; 212/160; 251/231, 297

[56] References Cited

U.S. PATENT DOCUMENTS

| Re. 31,539 | 3/1984 | Spalluto | 212/160 |
| 3,785,396 | 1/1974 | Morris et al. | 137/359 |
| 4,508,014 | 4/1985 | Shoff | 137/596.12 X |

Primary Examiner—Gerald A. Michalsky
Attorney, Agent, or Firm—Christensen, O'Connor, Johnson & Kindness

[57] ABSTRACT

A pendant for controlling the energization of pneumatic motors that position an overhead crane trolley and raise and lower an object supported by a hoist mounted on the trolley is disclosed. The pneumatic pendant includes a moisture-proof housing (11) and a plurality of manually actuated pneumatic control valves mounted in the housing. The control valves include a start/stop valve (69) and direction valves (119a–d) for directing forward and reverse air pressure to the crane trolley motor, and up and down air pressure to the hoist motor.

20 Claims, 3 Drawing Sheets

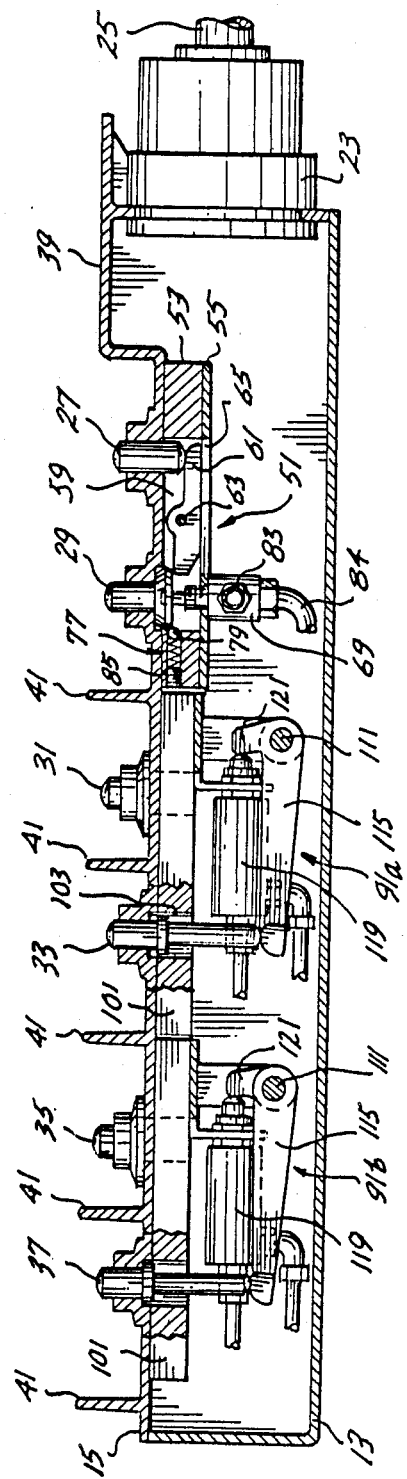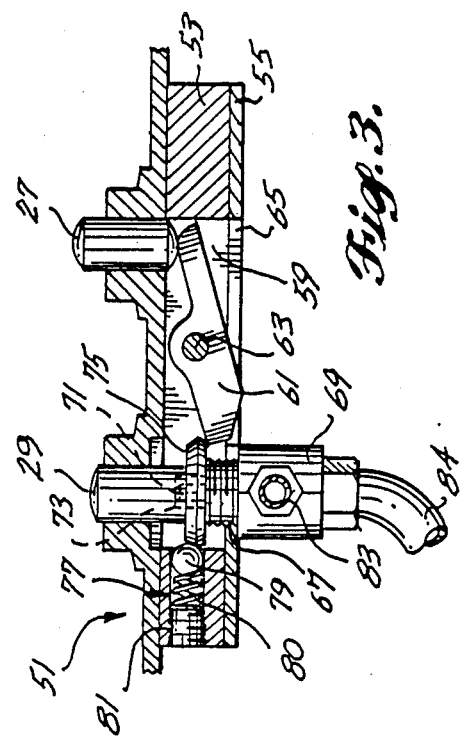

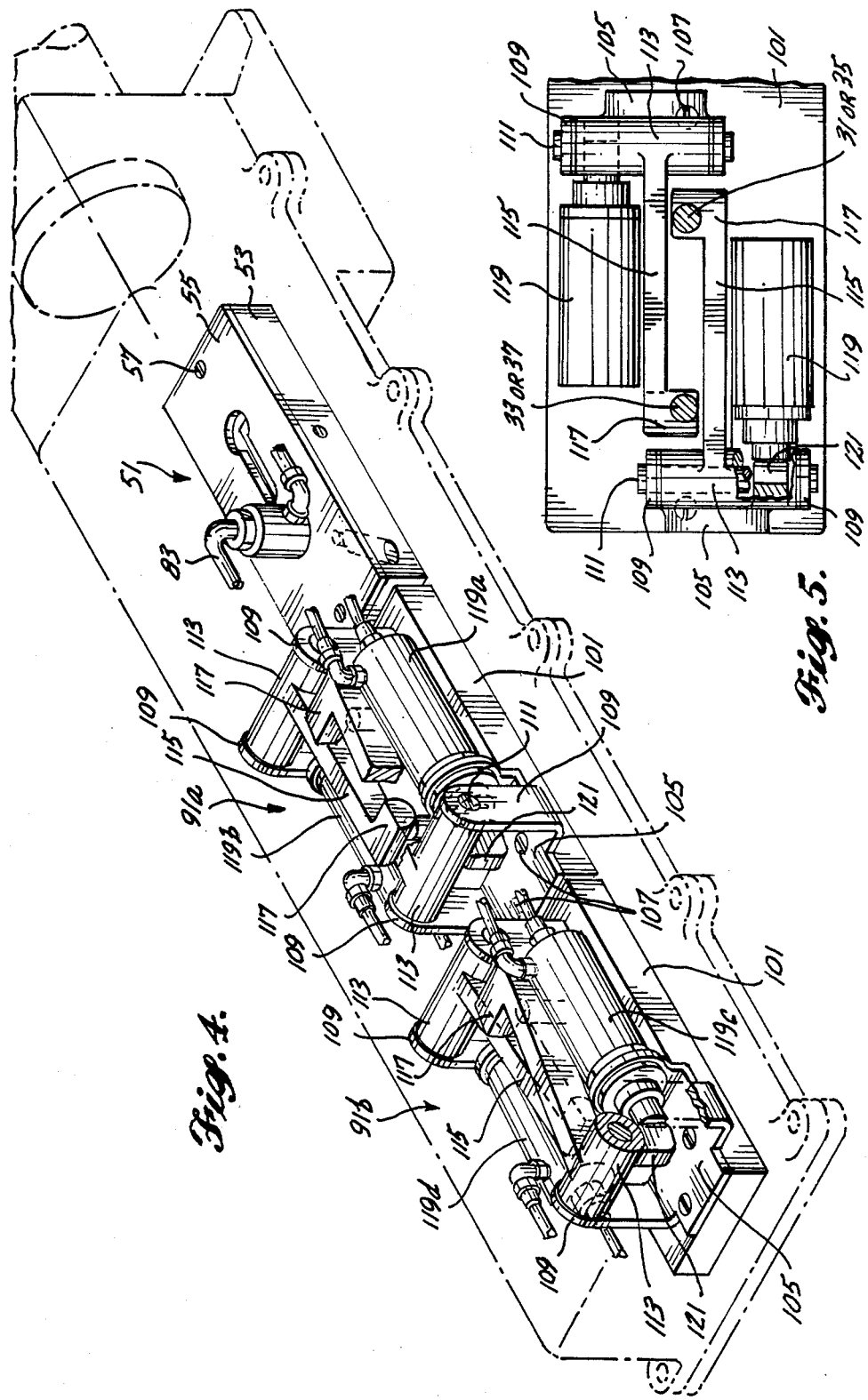

PNEUMATIC PENDANT

TECHNICAL AREA

This invention relates to pneumatic controllers and, more particularly, to controllers for controlling the motors of pneumatic crane trolley-hoists.

BACKGROUND OF THE INVENTION

In many environments, it is desirable to use crane trolley-hoists to lift and move large loads. Crane trolley-hoists comprise a trolley mounted on a long overhead support, usually an I-beam. The trolley is moved back and forth by appropriately energizing a trolley motor. When the trolley motor is energized, wheels that ride on the support rotate to move the trolley in one direction or the other. The trolley supports a hoist that is used to raise and lower a load. While some trolley hoists are manually actuated, many are powered. If the hoist is powered, the energization of a hoist motor mounted on the trolley causes the hoist to raise or lower a load supported by the hoist. Power to trolley and hoist motors is frequently controlled via a pendant hanging from the trolley.

Crane trolley-hoists are powered either by electric or pneumatic motors. Which type of power is chosen in a specific situation depends upon a variety of factors, such as the type of power available and the nature of the environment in which the crane trolley-hoist is to be used. In certain corrosive environments, such as on board ships, at ship loading docks, or in certain types of chemical plants, pneumatic crane trolley-hoists are often more desirable than electric crane trolley-hoists because they are less likely to break down. In the past, one major objection to the use of pneumatic crane trolley-hoists in such environments has been the lack of a well-sealed pendant suitable for controlling the trolley and hoist motors. This invention is directed to overcoming this disadvantage.

SUMMARY OF THE INVENTION

In accordance with this invention, a pendant for controlling the energization of pneumatic motors used to position an overhead crane trolley and raise and lower an object supported by a hoist mounted on the trolley is disclosed. The pneumatic pendant includes a moisture-proof housing and a plurality of control valves mounted in the housing. The control valves include a start/stop valve and direction valves for directing forward and reverse air pressure to the crane trolley motor, and up and down air pressure to the hoist motor. Preferably, the housing is similiar to that used in many electric pendants. More specifically, preferably the housing is formed of two pieces—an open topped box having side walls and a bottom that define a cavity; and, a cover plate that supports the valves and manual actuators for actuating the valves. The cover plate is sized to close the open top of the box. The cover plate is securely attached to the box by compression devices, such as cap screws and threaded holes located around the periphery of the interface between the box and the cover plate. The box and the cover plate are formed of a material having a long life expectancy in the corrosive environment in which the pneumatic pendant is to be used—a high impact plastic for example.

In accordance with other aspects of this invention, the start/stop valve is a latching valve having two bistable states. The state of the start/stop valve is controlled by a start actuator and a stop actuator. When the start actuator is actuated, the start/stop valve moves to a start state and remains in that state until the stop actuator is actuated. When the stop actuator is actuated, the start/stop valve moves to a stop state and remains in that state until the start actuator is again actuated. When in the start state, air flow from a suitable source is directed to the direction valves. When in the stop state, air flow to the direction valves is inhibited.

In accordance with further aspects of this invention, the direction valves include a forward valve and a reverse valve suitable for controlling the flow of air from the start/stop valve to the crane trolley motor; and, an up valve and a down valve suitable for controlling the flow of air from the start/stop valve to the hoist motor. The valve actuators are linearly arrayed, i.e., located along a straight line, and separated by protection protrusions.

In accordance with still further aspects of this invention, the direction valves are spring loaded valves that are closed in the absence of pressure on the movable element of the valve. Further, the direction valve actuators are coupled to the direction valves by lever arms. The valve actuators are positioned so as to be manually actuated. When actuated, the actuators change the position of related lever arms that, in turn, cause the opening of related valves. Release of the actuators results in the level arms returning to a valve closed position.

As will be readily appreciated from the foregoing description, a pneumatic pendant formed in accordance with the invention is ideally suited for use in harsh environments where corrosive materials, e.g., sea water, rapidly deteriorate exposed materials, particularly exposed materials formed of metal. Since the moisture-proof housing of the invention can be formed of a material suitable for use in such environments, all components subject to rapid deterioration, e.g., the control valves, are moisture-protected. As a result, a highly reliable, long-life pneumatic pendant is provided by the invention.

BRIEF DESCRIPTION OF THE DRAWINGS

The foregoing and other features and advantages of the present invention will become more readily appreciated as the same becomes better understood by reference to the following detailed description of a preferred embodiment of the invention and the accompanying drawings wherein:

FIG. 2 is a longitudinal cross-sectional view of the pneumatic pendant illustrated in FIG. 1;

FIG. 3 is an enlarged cross-sectional view of the start/stop valve of the pneumatic pendant illustrated in FIG. 2 showing the valve in the stopped position;

FIG. 4 is an inverted isometric view of the assembly of valves of the pneumatic pendant illustrated in FIG. 1;

FIG. 5 is a plan view of a portion of the valve assembly illustrated in FIG. 4; and, FIG. 6 is a schematic, pneumatic circuit diagram illustrating the way the valves illustrated in FIGS. 2-5 are connected together.

DESCRIPTION OF THE PREFERRED EMBODIMENT

Figure 1:
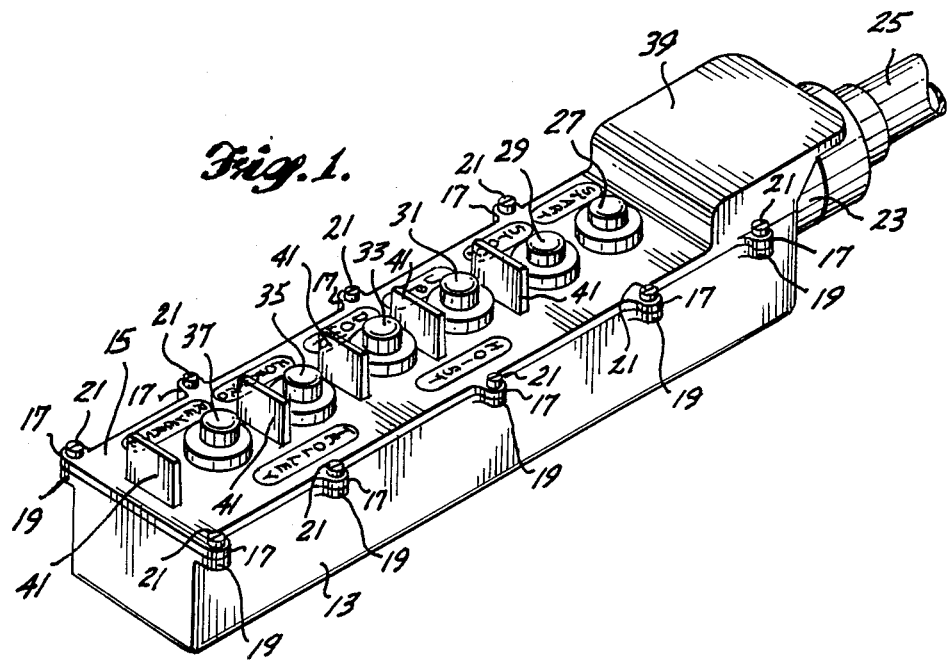
FIG. 1 is an isometric view of an assembled pneumatic pendant formed in accordance with the invention.

FIG. 1 illustrates a preferred embodiment of a pneumatic pendant formed in accordance with the invention.

The pneumatic pendant includes a moisture proof housing 11 comprising an open topped box 13 and a cover plate 15. Preferably, the box 13 is elongated and formed of a material having a long life expectancy when used in a corrosive, e.g., sea water, environment. Suitable materials are high-impact plastic and cast aluminum coated with corrosive-resistant paint. Preferably, the cover plate 15 is formed of the same material as the box 13. The cover plate 15 is sized to close the open top of the box 13. Located about the periphery of the cover plate 15 are a plurality of bosses 17 each positioned to overlie a related boss 19 formed along the upper edge of the walls of the box 13 when the cover plate 15 is suitably positioned atop the box 13. Cap screws 21 extend through the cover plate bosses 17 into threaded apertures in the box bosses 19. When tightened, the cap screws 21 tightly attach the cover plate 15 to the box 13. If desired, a gasket (not shown) can be inserted between the cover plate 15 and the box 13.

Mounted in one end of the box 13 is a connector 23 that attaches pneumatic tubes housed in a calbe 25 to pneumatic tubes located in the housing 11 and described below. The pneumatic tubes located in the housing 11 connect the cable tubes to various valves. As will be better understood from the following description of the valves mounted in the housing 11, the pneumatic tubes in the housing 11 and the cable 25 connect a source of air pressure to the valves and connect the valves to the pneumatic motors of a crane trolley-hoist to be controlled by a pneumatic pendant formed in accordance with this invention.

As will be better understood from the following description of the valves, a plurality of valve actuators positioned in a row in the cover plate 15 control the state of the valves. Starting at the end of the housing 11 nearest the connector 23, the valve actuators include a start actuator 27, a stop actuator 29, an up actuator 31, a down actuator 33, a forward actuator 35 and a reverse actuator 37. The start and stop actuators 27 and 29 control the state of a start/stop valve that controls the flow of air pressure to direction valves that are controlled by the up, down, forward and reverse actuators 31, 33, 35 and 37. As shown by legends in FIG. 1, the up/down actuators 31 and 33 are associated with the hoist motor and the forward reverse actuators 35 and 37 are associated with the trolley motor of a crane trolley-hoist.

Since the pendant is hung from the cable 25, it can swing back and forth when in use. This could result in the valve actuators banging against an adjacent structure and being damaged or inadvertently operated. This is prevented by outwardly extending protrusions. More specifically, located on the end of the pneumatic pendant housing nearest the connector 23 is a large protuberance 39. Located between the stop and up actuators 29 and 31, between the up and down actuators 31 and 33, between the down and forward actuators 33 and 35, between the forward and reverse actuators 35 and 37, and on the side of the reverse actuator remote from the forward actuator are smaller protrusions 41. The large protuberance 39 and the small protrusions 41 extend slightly beyond the outer ends of the farthest extending actuators. Preferably, the start, stop, up, down, forward and reverse actuators are surrounded (or entirely enclosed) by flexible diaphragms.

As best illustrated in FIGS. 2 and 3, the start and stop actuators 27 and 29 control the position of the movable elements of a start/stop valve assembly 51. The start/stop valve assembly 51 comprises a housing formed of a thick plate 53 and a thin plate 55. One surface of the thick plate 53 is attached to the undersurface of the cover plate 15, in alignment with the start and stop actuators 27 and 29. The thin plate 55 is attached to the other side of the thick plate 53. The thick plate 53 includes a cavity 59 having enlarged ends that are aligned with the start and stop actuators 27 and 29. A slot extends between the start and stop actuator ends. Rotatably mounted in the slot, on a pin 63, is a blade 61. One end of the blade 61 is aligned with the facing end of the start actuator 27.

The thin plate 55 includes a keyhole-shaped aperture 65 that is positioned such that the slot of the keyhole-shaped aperture is aligned with the blade 61; and, the enlarged end of the keyhole-shaped aperture is aligned with the start actuator 27. A threaded hole 67 is formed in the thin plate 55, in alignment with the stop actuator 29. Mounted in the threaded hole 67 is a pneumatic valve 69. The pneumatic valve 69 is positioned such that a plunger 71 that controls the position of the movable element of the valve is aligned with the stop actuator 29. More specifically, the plunger 71 is positioned in a cavity 73 formed in the adjacent end of the stop actuator 29. The stop actuator 29 includes an integral flange 75 that surrounds the cavity end of the stop actuator 29. The flange 75 has beveled upper and lower outer edges. The lower face of the flange is positioned to impinge on the end of the blade 61 remote from the start actuator 27. Orthogonally aligned with the flange 75 is a detent 77 formed by a ball 79 and a coil spring 80 mounted in a cavity 81 formed in the thick plate 53.

In operation, when the start actuator 27 is pressed, the blade 61 rotates about pin 63 and forces the flange 75 and, thus, the stop actuator 29 away from the valve 69. As the flange moves away from the valve 69, the ball 79 of the detent moves inwardly. After the flange passes the ball, the ball moves outwardly and latches the stop actuator in a position whereat the valve plunger 71 is fully extended. When in this position, the valve 69 is open and passes pressurized air from an inlet port 83 to an outlet port 84. When the stop actuator 29 is thereafter pressed, the ball 79 of the detent 77 is first forced inwardly against the spring 80 by the flange 75. After the flange 75 passes the ball 79, the ball is forced outwardly by the spring 80. As a result, the valve plunger 71 is again latched. When in this position, the valve plunger is fully depressed and the valve 69 is closed. The pneumatic valve 69 remains closed until the start actuator 27 is again pressed.

The hoist switch actuators, i.e., the up and down actuators 31 and 33, and the trolley actuators, i.e., the forward and reverse actuators 35 and 37, are each aligned with a pneumatic valve assembly 91a and 91b. Since the pneumatic valve assemblies are identical, only one is described in detail. Each of the pneumatic valve assemblies 91a and 91b includes a base plate 101 attached to the inner surface of the cover plate 15. The base plate includes holes 103 through which the related actuators 31 and 33 or 35 and 38 pass. Located at either end of the base plate 101 on the surface remote from the cover plate 15 are yokes 105. The cross legs of the yokes are attached to the base plate 101 by any suitable mechanism, such as cap screws 107. The outwardly extending legs of the yokes are oriented such that pins 111 passing through the legs lie transverse to the longitudinal axis of the pneumatic pendant. Rotatably mounted on the pins 111 are hubs 113 that are integrally formed with lever arms 115. The lever arms 115 include outward extending feet 117 positioned such that each of the feet are aligned with a related actuator 31, 33, 35 or 37. As a result, when an actuator is pressed, the associated lever arm 115 and hub 113 rotate about the pin 111 on which the hub 113 is mounted.

Mounted on the same surface of each base plate 101 as the yokes 115, outwardly from the lever arms 115, are two spring loaded pneumatic valves 119a, 119b, 119c and 119d. The pneumatic valves 119a, 119b, 119c and 119d are oriented and positioned such that the plungers of the valves are each aligned with a protrusion 121 integrally formed with one of the hubs 113. As a result, when one of the hubs 113 is rotated in the manner heretofore described, the plunger of the related valve 119 is moved from an extended position to a retracted position. More specifically, when the related actuator is not being pressed, the plunger of the related pneumatic valves 119a, 119b, 119c and 119d extends outwardly as the result of internal spring pressure. When in this position, the valve is closed. When an actuator is pressed, the related lever arm 115 rotates its integral hub 113 about the axis of the supporting pin 111. When this occurs, the protrusion 121 moves the plunger of the related pneumatic valve 119 inwardly. As a result, the pneumatic valve 119 is opened.

Figure 6:
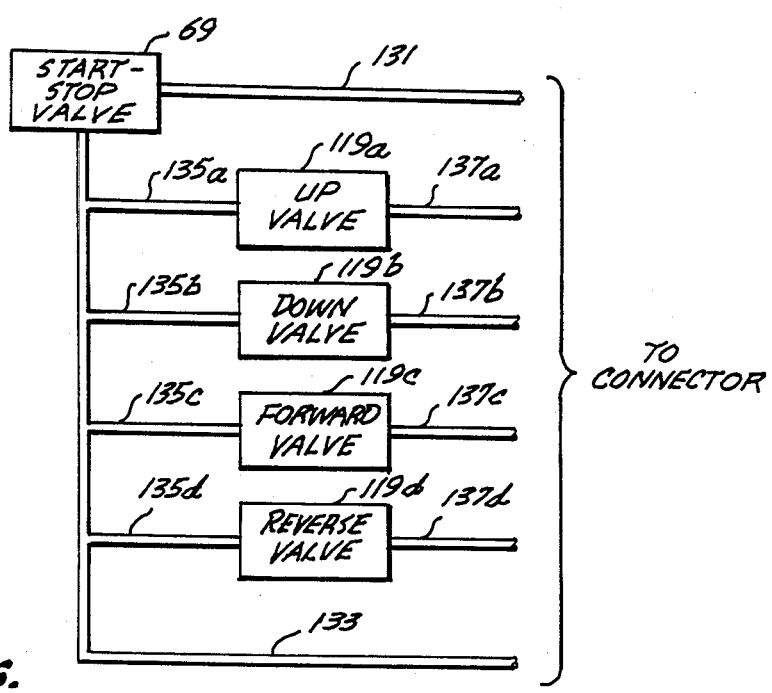

FIG. 6 is a pneumatic schematic diagram illustrating how the start/stop valve 69 and the hoist and trolley direction valves 119a, 119b, 119c and 119d are connected together by pneumatic tubing (which is not shown in FIGS. 2-5 in order to avoid confusion). As illustrated in FIG. 6, an input pneumatic tube 131 from the connector 23 is connected to the input port of and start/stop valve 69. The output port for the start/stop valve 69 is connected to bypass output tube 133 and by tubes 135a, 135b, 135c and 135d to the input ports of the up, down, forward and reverse valves 119a, 119b, 119c and 119d. The outlet port of the up valve 119a is connectable to the up input of a hoist motor via a tube 137a that runs to the connector 23 and another tube in the cable 25. The outlet port of the down valve 119b is connectable to the down input of a hoist motor via a tube 137b that runs to the connector 23 and another tube in the cable 25. Similarly, the output port of the forward valve 119c is connectable to the forward input of a trolley motor via a tube 137c that runs to the connector 23 and another tube in the cable 25; and, the output port of the reverse valve 119d is connectable to the reverse input of a trolley motor via a tube 137d that runs to the connector 23 and another tube in the cable 25.

In operation, when the start actuator 27 is pressed, the start/stop valve 69 is opened. As a result, the air pressure on input line 131 is applied to bypass line 133 and to the input ports of the up, down, forward and reverse valves 119a, 119b, 119c and 119d. Thereafter, when the actuator of one or more of the up, down, forward and reverse valves 119a, 119b, 119c and 119d is pressed, air pressure is applied to the related input of the hoist or trolley motor. In the case of the hoist motor, the hoist motor is thusly energized to raise or lower an object supported by the hoist motor. In the case of the trolley motor, the trolley object supported by the hoist motor. In the case of the trolley motor, the trolley motor is thusly energized to move the trolley forward or backward.

As will be readily appreciated from the foregoing description, the invention provides a pneumatic pendant that is ideally suited for use in an environment where corrosive liquids, such as sea water, are present. Because the start/stop and direction valves are housed in a moisture-proof enclosure formed of a corrosive resistant material, such as high impact plastic, the valves are not exposed to the corrosive liquid. Preferably, the valves are further protected by covering the valve actuators with flexible diaphragms designed to prevent moisture from entering the pendant housing 11 around the periphery of the actuators.

While a preferred embodiment of the invention has been illustrated and described, it will be appreciated that various changes can be made therein without departing from the spirit and scope of the invention.

The embodiments of the invention in which an exclusive property or privilege is claimed are defined as follows:

1. A pneumatic pendant for a crane trolley-hoist comprising:
   a moisture proof housing comprising a box, a cover plate and a mechanism for attaching said cover plate to said box in a moisture proof manner;
   a plurality of pneumatic control valves each having an inlet port and an outlet port for the receipt and discharge of air respectively mounted in said moisture proof housing, said plurality of pneumatic control valves including a start/stop valve and a plurality of direction valves, said start/stop valve allowing a continuous flow of air to pass through it when in a start position and blocking said flow of air when in a stop position;
   a plurality of actuators mounted in holes in said moisture proof housing, said plurality of actuators including start/stop and direction actuators for operating said start/stop valve and plurality of direction valves;
   a first tubing means for connecting a source of air to said inlet port of said start/stop valve; and,
   a second tubing means for coupling outlet port of said start/stop valve to said inlet port of said direction valves.

2. A pneumatic pendant for a crane trolley-hoist as claimed in claim 1, wherein said plurality of the direction valves include an up valve and a down valve and wherein said direction actuators include an up actuator and a down actuator for controlling the operation of said up valve and said down valve.

3. A pneumatic pendant for a crane trolley-hoist as claimed in claim 2 including lever arm mechanisms for coupling said up and down actuators to said up and down valves, respectively.

4. A pneumatic pendant for a crane trolley-hoist as claimed in claim 3, wherein each of said lever arm mechanisms comprises a yoke and lever arm, said lever arm rotatably mounted between the legs of said yoke, said lever arm including a protrusion positioned to impinge on the positioning element of its respective valve, said lever arm further including a leg that is positioned to be impinged on by its respective actuator.

5. A pneumatic pendant for a crane trolley-hoist as claimed in claim 2, wherein said plurality of direction valves also include a forward valve and a reverse valve and wherein said direction actuators also include a forward actuator and a reverse actuator for controlling the operation of said forward valve and said reverse valve.

6. A pneumatic pendant for a crane trolley-hoist as claimed in claim 5, including lever arm mechanisms for coupling said up, down, forward and reverse actuators to said up, down, forward and reverse valves, respectively.

7. A pneumatic pendant for a crane trolley-hoist as claimed in claim 6, wherein each of said lever arm mechanisms comprises a yoke and lever arm, said lever arm rotatably mounted between the legs of said yoke, said lever arm including a protrusion positioned to impinge on the positioning element of its respective valve, said lever arm further including a leg that is positioned to be impinged on by its respective actuator.

8. A pneumatic pendant for a crane trolley-hoist as claimed in claim 1, wherein said plurality of direction valve also include a forward valve and a reverse valve and wherein said direction actuators also include a forward actuator and a reverse actuator for controlling the operation of said forward valve and said reverse valve.

9. A pneumatic pendant for a crane trolley-hoist as claimed in claim 8 including lever arm mechanisms for coupling said forward and reverse actuators to said forward and reverse valves, respectively.

10. A pneumatic pendant for a crane trolley-hoist as claimed in claim 9, wherein each of said lever arm mechanisms comprises a yoke and lever arm, said lever arm rotatably mounted between the legs of said yoke, said lever arm including a protrusion positioned to impinge on the positioning element of its respective valve, said lever arm further including a leg that is positioned to be impinged on by its respective actuator.

11. A pneumatic pendant for a crane trolley-hoist as claimed in claim 1, wherein said start/stop actuator comprises a start actuator and a stop actuator, one of said start and stop actuators being aligned with said start/stop valve for actuating said start/stop valve when depressed, a detent mechanism positioned so as to interact with said aligned actuator, said detent mechanism configured to latch said aligned actuator in either one of two positions, said two positions including a position whereat said start/stop valve is open and a position whereat said start/stop valve is closed, said start/stop actuator also including a lever arm for coupling the nonaligned one of said start and stop actuators to the aligned one of said start and stop actuators such that the depression of said nonaligned actuator moves said aligned actuator to a position whereat said start/stop valve is in a selected one of said open and closed positions and such that the depression of said aligned one of said actuators moves said start/stop valve to the other of said open and closed positions.

12. A pneumatic pendant for a crane trolley-hoist as claimed in claim 11, wherein said plurality of the direction valves include an up valve and a down valve and wherein said direction actuators include an up actuator and a down actuator for controlling the operation of said up valve and said down valve.

13. A pneumatic pendant for a crane trolley-hoist as claimed in claim 12 including lever arm mechanisms for coupling said up and down actuators to said up and down valves, respectively.

14. A pneumatic pendant for a crane trolley-hoist as claimed in claim 13, wherein each of said lever arm mechanisms comprises a yoke and lever arm, said lever arm rotatably mounted between the legs of said yoke, said lever arm including a protrusion positioned to impinge on the positioning element of its respective valve, said lever arm further including a leg that is positioned to be impinged on by its respective actuator.

15. A pneumatic pendant for a crane trolley-hoist as claimed in claim 12, wherein said plurality of direction valves also include a forward valve and a reverse valve and wherein said direction actuators also include a forward actuator and a reverse actuator for controlling the operation of said forward valve and said reverse valve.

16. A pneumatic pendant for a crane trolley-hoist as claimed in claim 15, including lever arm mechanisms for coupling said up, down, forward and reverse actuators to said up, down, forward and reverse valves, respectively.

17. A pneumatic pendant for a crane trolley-hoist as claimed in claim 16, wherein each of said lever arm mechanisms comprises a yoke and lever arm, said lever arm rotatably mounted between the legs of said yoke, said lever arm including a protrusion positioned to impinge on the positioning element of its respective valve, said lever arm further including a leg that is positioned to be impinged on by its respective actuator.

18. A pneumatic pendant for a crane trolley-hoist as claimed in claim 11, wherein said plurality of direction valves also include a forward valve and a reverse valve and wherein said direction actuators also include a forward actuator and a reverse actuator for controlling the operation of said forward valve and said reverse valve.

19. A pneumatic pendant for a crane trolley-hoist as claimed in claim 8, includiing lever arm mechanisms for coupling said forward and reverse actuators to said forward and reverse valves, respectively.

20. A pneumatic pendant for a crane trolley-hoist as claimed in claim 19, wherein each of said lever arm mechanisms comprises a yoke and lever arm, said lever arm rotatably mounted between the legs of said yoke, said lever arm including a protrusion positioned to impinge on the positioning element of its respective valve, said lever arm further including a leg that is positioned to be impinged on by its respective actuator.

* * * * *

UNITED STATES PATENT AND TRADEMARK OFFICE
CERTIFICATE OF CORRECTION

PATENT NO. : 4,830,049

DATED : May 16, 1989

INVENTOR(S) : Glenn S. Smith

It is certified that error appears in the above-identified patent and that said Letters Patent is hereby corrected as shown below:

```
Column 6, line 38:   after "coupling" insert --said--
Column 7, line 13:   "valve" (first occurrence) should be --valves--
Column 8, line 41:   "claim 8" should be --claim 18--
```

Signed and Sealed this

Twentieth Day of February, 1990

Attest:

JEFFREY M. SAMUELS

Attesting Officer     Acting Commissioner of Patents and Trademarks